Figure 1:
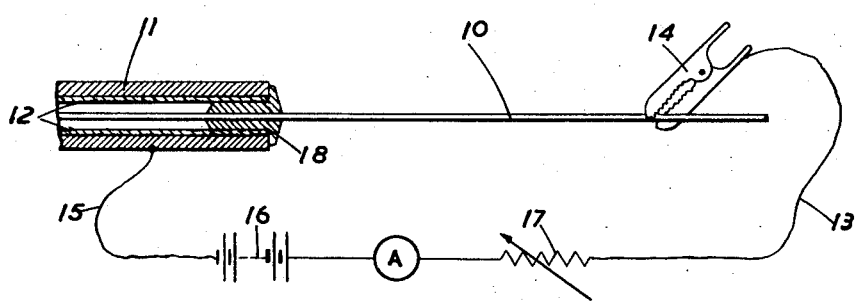

June 15, 1954

D. TWIVEY 2,681,403

METHOD FOR THE SOLDERING OF ARTICLES COMPRISING
ALUMINIUM OR ALLOYS THEREOF

Filed Aug. 21, 1952

Inventor
DERRICK TWIVEY
By Ralph E. Atherton
Attorney

Patented June 15, 1954

2,681,403

UNITED STATES PATENT OFFICE 2,681,403

METHOD FOR THE SOLDERING OF ARTICLES COMPRISING ALUMINIUM OR ALLOYS THEREOF

Derrick Twivey, Ealing, London, England, assignor to Electric & Musical Industries Limited, Hayes, England, a company of Great Britain Application August 21, 1952, Serial No. 305,640

Claims priority, application Great Britain August 24, 1951

3 Claims. (Cl. 219—12)

This invention relates to the soldering of articles consisting of aluminium or alloys thereof.

The difficulty of soldering aluminium articles, either to a similar metal or to other metals, is well known, and this difficulty presents itself even if the soldered joint does not require to have high mechanical strength but must provide a good electrical connection. The main problem to be overcome is the removal of the oxide film which is inevitably present and which prevents intimate contact between the aluminium and the solder, and this problem is aggravated by the fact that the oxide film tends to renew itself immediately after its removal.

Many attempts have been made to overcome the aforementioned problem, for example, by the use of special solders and fluxes, or by rubbing the aluminium surface thoroughly under a film of molten solder, but none of these expedients has proved entirely satisfactory.

In electrical equipment it is frequently desirable to make use of fine gauge wire of aluminium or an alloy thereof, and this type of wire is commonly provided with an electrically insulating oxide film produced by an anodising process. Thus to solder anidised aluminium wire satisfactorily, it is necessary to remove the oxide film in addition to any oxide which may form on the surface of the wire during the soldering process.

The object of the present invention is to provide a method of soldering articles consisting of aluminium or alloys thereof whereby a satisfactory soldered joint is produced particularly as regards its electrical properties, and the method according to the invention includes the step of establishing between said articles whilst in contact with one another a potential difference of a magnitude sufficient to break down the insulation of the aluminium oxide film present to cause the flow of an electric current between said articles, said current being maintained below a value at which fusion of either of said articles would take place, and thereafter effecting a soldered joint between said articles in the vicinity of the region in which said insulation has been broken down.

According to a particular embodiment of the invention, a method for effecting a soldered joint between an anodised aluminium wire and a tubular member of a material which can be readily soldered, includes the steps of providing the internal surface of said member with a coating of tinning material, establishing a potential difference between said wire and said member when in contact with one another so as to break down the insulation of the aluminium oxide film on said wire and to permit the flow of an appreciable electric current between said wire and said member, said current being maintained below a value at which fusion of said wire would take place and, whilst said current is flowing, applying molten solder to said member so that it flows between said wire and said coating thereby to effect a soldered joint between said member and said wire in the vicinity of the region in which the insulation of said film has been broken down.

Where the articles to be soldered are to be employed in electrical apparatus it is preferred to utilise for the soldering operation a solder of such a nature that contact potential differences between dissimilar metals are minimised.

Figure 2:
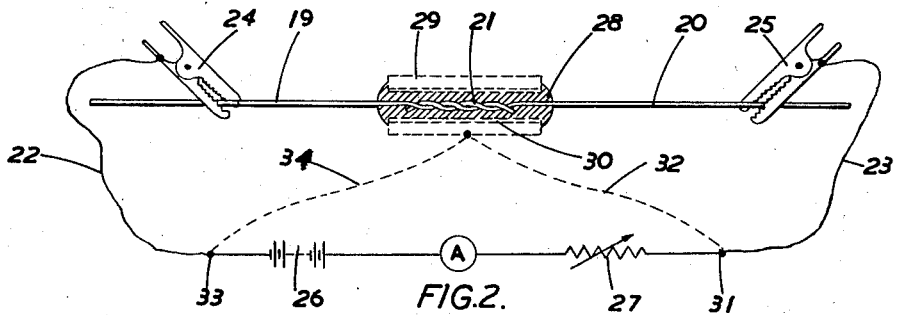

In order that the invention may be clearly understood and readily carried into effect, methods according to the invention for the soldering of fine gauge anodised aluminium wires will now be described with reference to the accompanying drawings in which:

Figure 1 is a schematic illustration of the soldering of an aluminium wire to a tubular member, and Figure 2 is a similar illustration of the soldering together of two aluminium wires.

In the embodiment illustrated in Figure 1 it is assumed that it is required to effect a good electrical and mechanical connection between a fine gauge anodised aluminium wire 10 having, for example, a diameter of the order of 0.002 of an inch, and a tubular member 11 of a material, such as brass, which can be readily soldered. The member 11 may have an internal diameter of the order of 0.005 of an inch and preferably its internal surface is provided with a coating 12 of tinning material. Where the member 11 is of brass the tinning material may comprise a tin-zinc alloy, for example, an alloy of approximately 80 per cent tin and the remainder zinc.

As shown the wire 10 is threaded into the bore of the member 11 and a projecting portion of the wire is connected to an electrical conductor 13 by means ensuring that a good electrical connection is established. For this purpose a crocodile clip 14 has been found satisfactory since the teeth of the clip are capable of puncturing the insulating oxide film on the surface of the wire 10. The member 11 is connected by any suitable means to an electrical conductor 15 and the conductors 13 and 15 are connected in circuit with a voltage source 16 in series with a variable impedance 17 and a current measuring instrument A such as an ammeter. The source 16, which may be A. C. or D. C. should be capable of developing a voltage up to approximately 500 volts, that, is, a voltage exceeding that required to break down the insulation of the oxide film on the wire 10.

With the circuit arrangement as illustrated in Figure 1 no appreciable current will flow in response to the establishment of a relatively low potential difference between the wire 10 and the member 11 in view of the high electrical resistance of the oxide film on the wire 10. As the voltage from the source 16 is increased the potential difference between the wire 10 and the member 11 rises until a point is reached at which the insulation of the oxide film on the wire 10 breaks down, and this point is indicated by a reading on the instrument A in response to an appreciable flow of current. By means of the variable impedance 17, the current is adjusted to a value greater than that which the soldered joint to be effected is ultimately intended to carry, but below a value at which the wire 10 would fuse.

Whilst the current flow is maintained molten solder depicted at 18 is applied to one or both ends of the member 11 for example by means of a soldering iron or a solder bath, such that the molten solder flows into the bore of the member 11 by capillary attraction, assisted by the coating 12 of tinning material. A soldered joint is thereby effected between the inner surface of the member 11 and those portions of the wire 10 where the oxide film has been removed as a result of the insulation break-down. Since sufficient of the oxide film is removed during the break-down to permit a current flow in excess of the normal current which the joint is ultimately intended to carry, it is found that the soldered joint produced by the method described is capable of carrying its normal current satisfactorily.

The mechanical strength and rigidity of the soldered joint is enhanced by the fact that the solder 18, when it cools, contracts and wedges firmly around the wire 10 within the bore of the member 11.

The particular type of solder used in the soldering operation is so chosen that it will not give rise to contact potential differences which might produce deleterious effects when the jointed wire is utilised in electrical apparatus. For example, if the member 11 is made of brass, the solder preferably comprises a tin-zinc alloy, containing approximately 80 per cent tin and the remainder zinc.

If desired, the ammeter A in the arrangement shown in Figure 1 can be omitted, and in this case the variable impedance 17 is so adjusted that when a voltage of, say 500 volts is applied, the current which flows when a break-down of the oxide film occurs is limited to a predetermined value in excess of the current which the soldered joint is ultimately intended to carry, but below that which would cause the wire 10 to fuse. For example, if the joint is to carry a current of 1 amp. and a potential difference of 500 volts is needed to break down the insulation of the oxide film, then the variable impedance is adjusted to approximately 250 ohms, and when the break-down takes place, a current of approximately 2 amps. flows; that is, twice the intended current-carrying capacity of the soldered joint to be effected.

To utilise a method according to the invention to effect a soldered joint between two anodised aluminium wires, the arrangement illustrated in Figure 2 can be employed. The ends of the two anodised aluminium wires 19 and 20 are intimately twisted together as indicated at 21, and portions of the wires at convenient distances from the twist 21 are connected to the electrical conductors 22 and 23, for example, by means of the crocodile clips 24 and 25, the conductors 22 and 23 being connected in circuit with the voltage source 26 in series with the variable impedance 27 and the current measuring instrument A in a manner similar to that described with reference to Figure 1. When a break-down of the insulation of the oxide films on the wires 19 and 20 has been effected by the establishment of a potential difference of sufficient magnitude between the wires, and whilst the resultant flow of current is maintained at an appropriate level, molten solder 28 is applied around the twist 21 in any convenient manner, to form the soldered joint. However additional mechanical strength can be imparted to such a joint by the use of a tubular member 29 having a coating 30 of tinning material similar to the member 11 in Figure 1, and preferably the joint is then effected in two stages. Firstly, the wire 19 is soldered to the member 29 with the circuit completed between the member 29 and the terminal 31 over the lead 32 to isolate the wire 20, and secondly, a similar procedure is followed with the circuit completed between the member 29 and the terminal 33 over the lead 34 to isolate the wire 19. The molten solder 28 may be applied to appropriate opposite ends of the member 29 respectively during the successive stages of the soldering operation, and to ensure good electrical contact not only between the respective wires 19 and 20 and the member 29 but also between the wires themselves, it may be desirable to effect a preliminary soldered joint between the wires 19 and 20, in the manner previously described. The use of the member 29 has a further advantage since if the molten solder, such as a tin-zinc alloy, does not flow very easily, there is a possibility that a joint effected between the wires 19 and 20 when simply twisted together, may be unsatisfactory, and the member 29 by virtue of its internal coating of tinning material, assists the flow of the molten solder.

Occasions may arise in electrical apparatus, where, for example, two anodised aluminium wires to be joined have their remote ends attached to parts of the apparatus. In this case a method according to the invention may be satisfactorily employed provided that the impedance between the remote ends of the wires is sufficiently high to have a negligible shunting effect with respect to the source of voltage such as 16 or 26 to be used for the purpose of establishing the required potential difference between the wires or between the wires and a tubular member such as 11 or 29.

Where an aluminium wire is to be soldered directly to a tubular member or a terminal tag in situ in a piece of apparatus, as may occur, for example, where the wire is to be joined to the terminal of an electrical component such as a condenser, a method according to the invention may be applied by threading the wire through the tag and then connecting the voltage source between the tag and the projecting end of the wire.

Although the invention has been described with reference to wires having an oxide coating produced by an anodising process, it is to be understood that the invention is equally applicable where the wire has no oxide coating intentionally provided thereon. Any article consisting of aluminium or an alloy thereof which has been exposed to air will, inevitably, have an oxide film thereon, and this film, however thin, will tend to prevent the production of a satisfactory soldered joint. In applying the invention in the case of wires on which no oxide film has been intentionally provided, the procedure may be substantially identical with that used for anodised wires, but it will be found, in general, that a much lower potential difference will be required to break down the insulation of the oxide film.

Where, in this specification, reference is made to an aluminium article or wire, that is to be considered as including such articles or wires made from an alloy containing an appreciable proportion of aluminium.

What I claim is:

1. A method of soldering a metal article containing aluminium to another metal article, including the steps of establishing between said articles whilst in contact with one another a potential difference of a value sufficient to break down the insulation of the aluminium oxide film present to produce an electric current between said articles, maintaining said current below a value at which fusion of either of said articles would take place, and thereafter effecting a soldered joint between said articles in the vicinity of the region in which said insulation has been broken down.

2. A method according to claim 1, including the step of coating said latter article with tinning material in the region in which the soldered joint is to be effected prior to the soldering step.

3. A method for effecting a soldered joint between an anodised aluminium wire and a tubular member of a material which can be readily soldered, including the steps of providing the internal surface of said member with a coating of tinning material, establishing a potential difference between said wire and said member when in contact with one another to break down the insulation of the aluminium oxide film on said wire and to produce the flow of an appreciable electric current between said wire and said member, maintaining said current below a value at which fusion of said wire would take place, and, whilst said current is flowing, applying molten solder to said member so that it flows between said wire and said coating thereby to effect a soldered joint between said member and said wire in the vicinity of the region in which the insulation of said film has been broken down.

References Cited in the file of this patent

UNITED STATES PATENTS

| Number | Name | Date |
|---|---|---|
| 2,114,837 | Gillette | Apr. 19, 1938 |
| 2,414,461 | Gilliver | Jan. 21, 1947 |
| 2,535,397 | Duch et al. | Dec. 26, 1950 |